United States Patent
Pierce (10) Patent No.: US 9,434,327 B2
(45) Date of Patent: Sep. 6, 2016

(54) IMAGING SYSTEM INCLUDING DYNAMIC COMPENSATION FOR COLOR ATTENUATION FOR VEHICLE WINDSCREENS

(71) Applicant: Gentex Corporation, Zeeland, MI (US)

(72) Inventor: Phillip R. Pierce, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 165 days.

(21) Appl. No.: 14/541,385

(22) Filed: Nov. 14, 2014

(65) Prior Publication Data

US 2015/0142206 A1 May 21, 2015

Related U.S. Application Data

(60) Provisional application No. 61/904,629, filed on Nov. 15, 2013.

(51) Int. Cl.
*G06K 9/00* (2006.01)
*B60R 16/02* (2006.01)
(Continued)

(52) U.S. Cl.
CPC ........... *B60R 16/02* (2013.01); *G06K 9/00825* (2013.01); *G06T 1/0007* (2013.01); *G06K 2209/23* (2013.01); *G06T 2207/10004* (2013.01); *G06T 2207/10024* (2013.01); *G06T 2207/30236* (2013.01); *G06T 2207/30268* (2013.01); *H04N 7/18* (2013.01)

(58) Field of Classification Search
None
See application file for complete search history.

(56) References Cited

U.S. PATENT DOCUMENTS 2,131,888 A 10/1938 Harris
2,632,040 A 3/1953 Rabinow
(Continued)

FOREIGN PATENT DOCUMENTS

DE 2946561 5/1981
EP 1504957 A2 9/2005
(Continued)

OTHER PUBLICATIONS

Christopher M. Kormanyos, "SAE Paper No. 980003 entitled "HID System with Adaptive Vertical AIM Control"," p. 13-18.
(Continued)

*Primary Examiner* — Shefali Goradia
(74) *Attorney, Agent, or Firm* — Price Heneveld LLP; Scott P. Ryan (57) ABSTRACT

An imaging system for a vehicle is disclosed having an image sensor positioned in the vehicle for capturing images through a windscreen of the vehicle and for generating image data corresponding to the captured images, and a processor coupled to the image sensor for receiving and analyzing the image data and detecting vehicle light sources in the captured images. The processor: detects a predetermined number of vehicle light sources; averages color values of each detected vehicle light source; determines differences between the averaged color values and target color values; and stores the differences as color compensation values. A vehicle equipment control system is further disclosed having the imaging system above, wherein the processor compensates color values of subsequently detected vehicle light sources and generates a control signal that is used to control the vehicle equipment in response to the detection of color compensated vehicle light sources in the captured images.

20 Claims, 7 Drawing Sheets

(51) Int. Cl.
*G06T 1/00* (2006.01)
*H04N 7/18* (2006.01)

(56) References Cited

U.S. PATENT DOCUMENTS

| | | |
|---|---|---|
| 2,827,594 A | 3/1958 | Rabinow |
| 3,179,845 A | 4/1965 | Kulwiec |
| 3,581,276 A | 5/1971 | Newman |
| 3,663,819 A | 5/1972 | Hicks et al. |
| 4,139,801 A | 2/1979 | Linares |
| 4,151,526 A | 4/1979 | Hinachi et al. |
| 4,236,099 A | 11/1980 | Rosenblum |
| 4,258,979 A | 3/1981 | Mahin |
| 4,286,308 A | 8/1981 | Wolff |
| 4,357,558 A | 11/1982 | Massoni et al. |
| 4,376,909 A | 3/1983 | Tagami et al. |
| 4,479,173 A | 10/1984 | Rumpakis |
| 4,599,544 A | 7/1986 | Martin |
| 4,645,975 A | 2/1987 | Meitzler et al. |
| 4,665,321 A | 5/1987 | Chang et al. |
| 4,692,798 A | 9/1987 | Seko et al. |
| 4,716,298 A | 12/1987 | Etoh |
| 4,727,290 A | 2/1988 | Smith et al. |
| 4,768,135 A | 8/1988 | Kretschmer et al. |
| 4,862,037 A | 8/1989 | Farber et al. |
| 4,891,559 A | 1/1990 | Matsumoto et al. |
| 4,930,742 A | 6/1990 | Schofield et al. |
| 4,934,273 A | 6/1990 | Endriz |
| 4,967,319 A | 10/1990 | Seko |
| 5,008,946 A | 4/1991 | Ando |
| 5,036,437 A | 7/1991 | Macks |
| 5,072,154 A | 12/1991 | Chen |
| 5,086,253 A | 2/1992 | Lawler |
| 5,096,287 A | 3/1992 | Kakinami et al. |
| 5,124,549 A | 6/1992 | Michaels et al. |
| 5,166,681 A | 11/1992 | Bottesch et al. |
| 5,182,502 A | 1/1993 | Slotkowski et al. |
| 5,187,383 A | 2/1993 | Taccetta et al. |
| 5,235,178 A | 8/1993 | Hegyi |
| 5,329,206 A | 7/1994 | Slotkowski et al. |
| 5,347,261 A | 9/1994 | Adell |
| 5,347,459 A | 9/1994 | Greenspan et al. |
| 5,355,146 A | 10/1994 | Chiu et al. |
| 5,373,482 A * | 12/1994 | Gauthier ............ B60Q 1/0023 367/13 |
| 5,379,104 A | 1/1995 | Takao |
| 5,396,054 A | 3/1995 | Krichever et al. |
| 5,402,170 A | 3/1995 | Parulski et al. |
| 5,416,318 A | 5/1995 | Hegyi |
| 5,426,294 A | 6/1995 | Kobayashi et al. |
| 5,428,464 A | 6/1995 | Silverbrook |
| 5,430,450 A | 7/1995 | Holmes |
| 5,434,407 A | 7/1995 | Bauer et al. |
| 5,451,822 A | 9/1995 | Bechtel et al. |
| 5,452,004 A | 9/1995 | Roberts |
| 5,471,515 A | 11/1995 | Fossum et al. |
| 5,475,441 A | 12/1995 | Parulski et al. |
| 5,481,268 A | 1/1996 | Higgins |
| 5,483,346 A | 1/1996 | Butzer |
| 5,485,155 A | 1/1996 | Hibino |
| 5,508,592 A | 4/1996 | Lapatovich et al. |
| 5,537,003 A | 7/1996 | Bechtel et al. |
| 5,541,724 A | 7/1996 | Hoashi |
| 5,550,677 A | 8/1996 | Schofield et al. |
| 5,554,912 A | 9/1996 | Thayer et al. |
| 5,574,463 A | 11/1996 | Shirai et al. |
| 5,587,929 A | 12/1996 | League et al. |
| 5,592,146 A | 1/1997 | Kover, Jr. |
| 5,614,788 A | 3/1997 | Mullins et al. |
| 5,621,460 A | 4/1997 | Hatlestad et al. |
| 5,660,454 A | 8/1997 | Mori et al. |
| 5,666,028 A | 9/1997 | Bechtel et al. |
| 5,684,473 A | 11/1997 | Hibino et al. |
| 5,707,129 A | 1/1998 | Kobayashi |
| 5,710,565 A | 1/1998 | Shirai et al. |
| 5,714,751 A | 2/1998 | Chen |
| 5,715,093 A | 2/1998 | Schierbeek et al. |
| 5,736,816 A | 4/1998 | Strenke et al. |
| 5,751,832 A | 5/1998 | Panter et al. |
| 5,781,105 A | 7/1998 | Bitar et al. |
| 5,786,787 A | 7/1998 | Eriksson et al. |
| 5,796,094 A | 8/1998 | Schofield et al. |
| 5,798,727 A | 8/1998 | Shirai et al. |
| 5,811,888 A | 9/1998 | Hsieh |
| 5,812,321 A | 9/1998 | Schierbeek et al. |
| 5,835,613 A | 11/1998 | Breed et al. |
| 5,837,994 A | 11/1998 | Stam et al. |
| 5,841,126 A | 11/1998 | Fossum et al. |
| 5,845,000 A | 12/1998 | Breed et al. |
| 5,859,714 A * | 1/1999 | Nakazawa ........ B32B 17/10036 359/13 |
| 5,867,214 A | 2/1999 | Anderson et al. |
| 5,877,897 A | 3/1999 | Schofield et al. |
| 5,905,457 A | 5/1999 | Rashid |
| 5,912,534 A | 6/1999 | Benedict |
| 5,923,027 A | 7/1999 | Stam et al. |
| 5,942,853 A | 8/1999 | Piscart |
| 5,990,469 A | 11/1999 | Bechtel et al. |
| 6,008,486 A | 12/1999 | Stam et al. |
| 6,018,308 A | 1/2000 | Shirai |
| 6,049,171 A | 4/2000 | Stam et al. |
| 6,097,023 A | 8/2000 | Schofield et al. |
| 6,102,546 A | 8/2000 | Carter |
| 6,130,421 A | 10/2000 | Bechtel et al. |
| 6,130,448 A | 10/2000 | Bauer et al. |
| 6,140,933 A | 10/2000 | Bugno et al. |
| 6,144,158 A | 11/2000 | Beam |
| 6,166,698 A | 12/2000 | Turnbull et al. |
| 6,184,781 B1 | 2/2001 | Ramakesavan |
| 6,255,639 B1 | 7/2001 | Stam et al. |
| 6,281,632 B1 | 8/2001 | Stam et al. |
| 6,329,925 B1 | 12/2001 | Skiver et al. |
| 6,349,782 B1 | 2/2002 | Sekiya et al. |
| 6,356,376 B1 | 3/2002 | Tonar et al. |
| 6,379,013 B1 | 4/2002 | Bechtel et al. |
| 6,396,040 B1 | 5/2002 | Hill |
| 6,396,397 B1 | 5/2002 | Bos et al. |
| 6,403,942 B1 | 6/2002 | Stam |
| 6,429,594 B1 | 8/2002 | Stam et al. |
| 6,442,465 B2 | 8/2002 | Breed et al. |
| 6,443,602 B1 | 9/2002 | Tanabe et al. |
| 6,465,962 B1 | 10/2002 | Fu et al. |
| 6,469,739 B1 | 10/2002 | Bechtel et al. |
| 6,483,438 B2 | 11/2002 | DeLine et al. |
| 6,491,416 B1 | 12/2002 | Strazzanti |
| 6,507,779 B2 | 1/2003 | Breed et al. |
| 6,550,943 B2 | 4/2003 | Strazzanti |
| 6,553,130 B1 | 4/2003 | Lemelson et al. |
| 6,558,026 B2 | 5/2003 | Strazzanti |
| 6,559,435 B2 | 5/2003 | Schofield et al. |
| 6,587,573 B1 | 7/2003 | Stam et al. |
| 6,593,698 B2 | 7/2003 | Stam et al. |
| 6,611,610 B1 | 8/2003 | Stam et al. |
| 6,617,564 B2 | 9/2003 | Ockerse et al. |
| 6,631,316 B2 | 10/2003 | Stam et al. |
| 6,677,986 B1 | 1/2004 | Pöchmüller |
| 6,728,393 B2 | 4/2004 | Stam et al. |
| 6,772,057 B2 | 8/2004 | Breed et al. |
| 6,774,988 B2 | 8/2004 | Stam et al. |
| 6,824,281 B2 | 11/2004 | Schofield et al. |
| 6,861,809 B2 | 3/2005 | Stam |
| 6,902,307 B2 | 6/2005 | Strazzanti |
| 6,913,375 B2 | 7/2005 | Strazzanti |
| 6,928,180 B2 | 8/2005 | Stam et al. |
| 6,946,978 B2 | 9/2005 | Schofield |
| 6,999,004 B2 | 2/2006 | Comaniciu et al. |
| 7,012,543 B2 | 3/2006 | Deline et al. |
| 7,038,577 B2 | 5/2006 | Pawlicki et al. |
| 7,049,945 B2 | 5/2006 | Breed et al. |
| 7,255,465 B2 | 8/2007 | Deline et al. |
| 7,262,406 B2 | 8/2007 | Heslin et al. |
| 7,265,342 B2 | 9/2007 | Heslin et al. |
| 7,311,428 B2 | 12/2007 | Deline et al. |
| 7,321,112 B2 | 1/2008 | Stam et al. |

(56) References Cited

U.S. PATENT DOCUMENTS

| | | |
|---|---|---|
| 7,417,221 B2 | 8/2008 | Creswick et al. |
| 7,446,650 B2 | 11/2008 | Schofield et al. |
| 7,467,883 B2 | 12/2008 | Deline et al. |
| 7,468,651 B2 | 12/2008 | Deline et al. |
| 7,526,103 B2 | 4/2009 | Schofield et al. |
| 7,533,998 B2 | 5/2009 | Schofield et al. |
| 7,565,006 B2 | 7/2009 | Stam et al. |
| 7,567,291 B2 | 7/2009 | Bechtel et al. |
| 7,575,348 B2 | 8/2009 | Hasegawa |
| 7,653,215 B2 | 1/2010 | Stam |
| 7,658,521 B2 | 2/2010 | Deline et al. |
| 7,683,326 B2 | 3/2010 | Stam et al. |
| 7,708,434 B2 | 5/2010 | Moizard et al. |
| 7,719,408 B2 | 5/2010 | DeWard et al. |
| 7,720,580 B2 | 5/2010 | Higgins-Luthman |
| 7,724,450 B2 * | 5/2010 | Martynov ........... F21S 48/2218 359/726 |
| 7,815,326 B2 | 10/2010 | Blank et al. |
| 7,877,175 B2 | 1/2011 | Higgins-Luthman |
| 7,881,839 B2 | 2/2011 | Stam et al. |
| 7,888,629 B2 | 2/2011 | Heslin et al. |
| 7,914,188 B2 | 3/2011 | Deline et al. |
| 7,972,045 B2 | 7/2011 | Schofield |
| 7,994,471 B2 | 8/2011 | Heslin et al. |
| 8,045,760 B2 | 10/2011 | Stam et al. |
| 8,063,753 B2 | 11/2011 | Deline et al. |
| 8,090,153 B2 | 1/2012 | Schofield et al. |
| 8,100,568 B2 | 1/2012 | Deline et al. |
| 8,116,929 B2 | 2/2012 | Higgins-Luthman |
| 8,120,652 B2 | 2/2012 | Bechtel et al. |
| 8,142,059 B2 | 3/2012 | Higgins-Luthman et al. |
| 8,162,518 B2 | 4/2012 | Schofield |
| 8,203,443 B2 | 6/2012 | Bos et al. |
| 8,217,830 B2 | 7/2012 | Lynam |
| 8,222,588 B2 | 7/2012 | Schofield et al. |
| 8,258,433 B2 | 9/2012 | Byers et al. |
| 8,289,142 B2 | 10/2012 | Pawlicki et al. |
| 8,289,430 B2 | 10/2012 | Bechtel et al. |
| 8,325,028 B2 | 12/2012 | Schofield et al. |
| 8,492,698 B2 | 7/2013 | Schofield et al. |
| 8,543,254 B1 | 9/2013 | Schut et al. |
| 8,718,899 B2 | 5/2014 | Schwindt et al. |
| 2002/0040962 A1 | 4/2002 | Schofield et al. |
| 2002/0047087 A1 | 4/2002 | Schofield et al. |
| 2003/0202357 A1 | 10/2003 | Strazzanti |
| 2004/0145905 A1 | 7/2004 | Strazzanti |
| 2008/0044062 A1 | 2/2008 | Stam et al. |
| 2008/0192132 A1 | 8/2008 | Bechtel et al. |
| 2008/0195276 A1 | 8/2008 | Stam et al. |
| 2008/0294315 A1 | 11/2008 | Breed |
| 2012/0072080 A1 | 3/2012 | Jeromin et al. |
| 2013/0028473 A1 | 1/2013 | Hilldore et al. |
| 2014/0036080 A1 | 2/2014 | Schut et al. |
| 2014/0247351 A1 | 9/2014 | Murillo Amaya et al. |

FOREIGN PATENT DOCUMENTS

| | | |
|---|---|---|
| FR | 2641237 | 7/1990 |
| FR | 2726144 | 4/1996 |
| GB | 2313973 | 12/1997 |
| JP | 5744541 | 3/1982 |
| JP | 6015237 | 1/1985 |
| JP | 62131837 | 6/1987 |
| JP | 01233129 | 9/1989 |
| JP | 5139203 | 6/1993 |
| JP | 5342901 | 12/1993 |
| JP | 06151067 | 5/1994 |
| JP | 06267304 | 9/1994 |
| JP | 6276524 | 9/1994 |
| JP | 6295601 | 10/1994 |
| JP | 6321007 | 11/1994 |
| JP | 732936 | 2/1995 |
| JP | 747878 | 2/1995 |
| JP | 7052706 | 2/1995 |
| JP | 769125 | 3/1995 |
| JP | 8166221 | 6/1996 |
| JP | 08221700 | 8/1996 |
| JP | 2010020483 | 1/2010 |
| WO | 8605147 | 9/1986 |
| WO | 9735743 | 10/1997 |
| WO | 9843850 | 10/1998 |
| WO | 9947396 | 10/1999 |
| WO | 0022881 | 4/2000 |

OTHER PUBLICATIONS

J.P. Lowenau et al, "SAE Paper No. 980007 entitled "Adaptive Light Control—A New Light Concept Controlled by Vehicle Dynamics and Navigation"," p. 33-38.

Franz-Josef Kalze, "SAE Paper No. 980005 entitled "Xenon Light for Main and Dipped Beam"," p. 23-26.

Tohru Shimizu et al, (SAE Paper No. 980322 entitled "Development of PWM DRL with Low RF Emissions and Low Heat", p. 113-117.

Patent Cooperation Treaty, International Searching Authority, International Search Report, Written Opinion of the International Searching Authority and Notification of Transmittal, Apr. 29, 2015, 11 pages.

\* cited by examiner

# IMAGING SYSTEM INCLUDING DYNAMIC COMPENSATION FOR COLOR ATTENUATION FOR VEHICLE WINDSCREENS

CROSS-REFERENCE TO RELATED APPLICATION

This application claims priority to and the benefit under 35 U.S.C. §119(e) of U.S. Provisional Patent Application No. 61/904,629, filed on Nov. 15, 2013, entitled "IMAGING SYSTEM INCLUDING DYNAMIC COMPENSATION FOR COLOR ATTENUATION FOR VEHICLE WINDSCREENS," the entire disclosure of which is hereby incorporated herein by reference.

FIELD OF THE INVENTION

The present invention generally relates to a vehicle imaging system. According to some embodiments, the imaging system is used to control vehicle equipment, such as exterior lights of the vehicle.

SUMMARY OF THE INVENTION

According to one aspect of the present invention, an imaging system for a vehicle is provided comprising an image sensor positioned in the vehicle for capturing images through a windscreen of the vehicle and for generating image data corresponding to the captured images, and a processor coupled to the image sensor configured for receiving and analyzing the image data and detecting vehicle light sources in the captured images. The processor is further configured to: (a) detect a predetermined number of vehicle light sources; (b) average color values of each detected vehicle light source; (c) determine differences between the averaged color values and target color values; and (d) store the differences as color compensation values to be used to compensate color values of subsequently detected vehicle light sources.

According to another embodiment of the present invention, a vehicle equipment control system for a controlled vehicle is provided comprising an image sensor positioned in the vehicle for capturing images through a windscreen of the controlled vehicle and for generating image data corresponding to the captured images, and a processor coupled to the image sensor configured for receiving and analyzing the image data and detecting vehicle light sources in the captured images. The processor is further configured to: (a) categorize the detected vehicle light sources into at least two light source bands; (b) detect vehicle light sources in each light source band; (c) average color values of each detected vehicle light source in each light source band; (d) determine differences between the averaged color values and target color values in each light source band; (e) store the differences as color compensation values in each light source band to be used to compensate color values of subsequently detected vehicle light sources categorized in a corresponding light source band; and (f) generate a signal that may be used to control the vehicle equipment in response to the detection of color compensated vehicle light sources in the captured images.

According to another embodiment of the present invention, a method for controlling equipment of a controlled vehicle is provided comprising: (a) imaging a scene external and forward of the controlled vehicle and generating image data corresponding to the acquired images; (b) detecting a predetermined number of vehicle light sources; (c) averaging color values of each detected vehicle light source; (d) determining differences between the averaged color values and target color values; (e) storing the differences as color compensation values to be used to compensate color values of subsequently detected vehicle light sources; and (f) generating a control signal that may be used to control the vehicle equipment in response to the detection of color compensated vehicle light sources in the captured images.

According to another embodiment of the present invention, a non-transitory computer readable medium is provided having stored thereon software instructions that, when executed by a processor, cause the processor to control equipment of a controlled vehicle, by executing the steps comprising: (a) imaging a scene external and forward of the controlled vehicle and generating image data corresponding to the acquired images; (b) detecting vehicle light sources; (c) averaging color values of each detected vehicle light source; (d) determining differences between the averaged color values and target color values; (e) storing the differences as color compensation values to be used to compensate color values of subsequently detected vehicle light sources; and (f) generating a control signal that may be used to control the vehicle equipment in response to the detection of color compensated vehicle light sources in the captured images.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION OF THE EMBODIMENTS

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

The terms "including," "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The embodiments generally relate to a vehicle imaging system with improved image processing and to a vehicle equipment control system using such an imaging system. Vehicle imaging systems typically capture images of a scene exterior of the vehicle using an image sensor (or camera) having a field of view through the windscreen or other window. The captured images may then be displayed and/or analyzed in order to control vehicle equipment. For example, such imagers have been used for exterior light control systems, lane departure warning systems, forward collision warning systems, adaptive cruise control systems, pedestrian detection systems, night vision systems, terrain detection systems, parking assist systems, and traffic sign recognition systems. Examples of systems using imagers for such purposes are disclosed in U.S. Pat. Nos. 5,837,994, 5,990,469, 6,008,486, 6,049,171, 6,130,421, 6,130,448, 6,166,698, 6,379,013, 6,403,942, 6,587,573, 6,611,610, 6,631,316, 6,774,988, 6,861,809, 7,321,112, 7,417,221, 7,565,006, 7,567,291, 7,653,215, 7,683,326, 7,881,839, 8,045,760, and 8,120,652, and 8,543,254 and in U.S. Provisional Application Nos. 61/512,213 entitled "RAISED LANE MARKER DETECTION SYSEM AND METHOD THEREOF" filed on Jul. 27, 2011, by Brock R. Rycenga et al., and 61/512,158 entitled "COLLISION WARNING SYSTEM AND METHOD THEREOF" filed on Jul. 27, 2011, by Brock R. Rycenga et al., the entire disclosures of which are incorporated herein by reference.

Some of the embodiments described herein relate to an exterior light control system for controlling exterior lights (as the vehicle equipment) of a controlled vehicle in response to image data acquired from an image sensor, which captures images forward of the vehicle. Auto High Beam (AHB) and alternate methods of controlling the light beam illumination in front of a motor vehicle maximizes the use of high beams at night by identifying oncoming and preceding vehicles and automatically controlling the high beam lighting pattern. This prevents glare to other vehicles, yet maintains a high beam light distribution to illuminate areas not occupied by other vehicles. Prior systems are known for controlling exterior vehicle lights in response to images captured forward of the vehicle. In these prior systems, a processor would analyze the captured images and determine if any preceding or oncoming vehicles were present in a glare area in front of the vehicle employing the system. This "glare area" was the area in which the exterior lights would cause excessive glare to a driver if the exterior lights were in a high beam state (or some state other than a low beam state). If a vehicle was present in the glare area, the processor would respond by changing the state of the exterior lights so as to not cause glare for the other driver(s). Glare to other drivers can be prevented by moving a blocking mechanism in the high beam headlamps that blocks portions of the light otherwise generated by the headlamps from projecting in selected glare-free regions of the forward scene. Examples of such systems are described in U.S. Pat. Nos. 5,837,994, 5,990,469, 6,008,486, 6,049,171, 6,130,421, 6,130,448, 6,166,698, 6,255,639, 6,379,013, 6,403,942, 6,587,573, 6,593,698, 6,611,610, 6,631,316, 6,653,614, 6,728,393, 6,774,988, 6,861,809, 6,906,467, 6,947,577, 7,321,112, 7,417,221, 7,565,006, 7,567,291, 7,653,215, 7,683,326, 7,881,839, 8,045,760, 8,120,652, and 8,543,254, the entire disclosures of which are incorporated herein by reference.

Because the image sensors are typically located to view a forward scene through the vehicle windscreen, prior systems have used a windscreen gain correction to account for spectral differences in the various types of vehicle windscreens. Such windscreen gain correction corrects for color offset only and does not attempt to correct for differences in overall percent light transmission between various types of vehicle windscreens. The prior systems have determined windscreen gain parameters by manually analyzing drive data captured with the imaging system planned for an equipped vehicle (or several vehicles if there is more than one windscreen type). This approach determines accurate parameters; however, it is not always possible to obtain drive data with each vehicle and windscreen combination prior to production. Further, it is possible that an equipped vehicle may subsequently have its windshield replaced with a windshield that is of a different type than was originally equipped on the vehicle. For example, IR glass may be used instead of clear glass.

Figure 1:
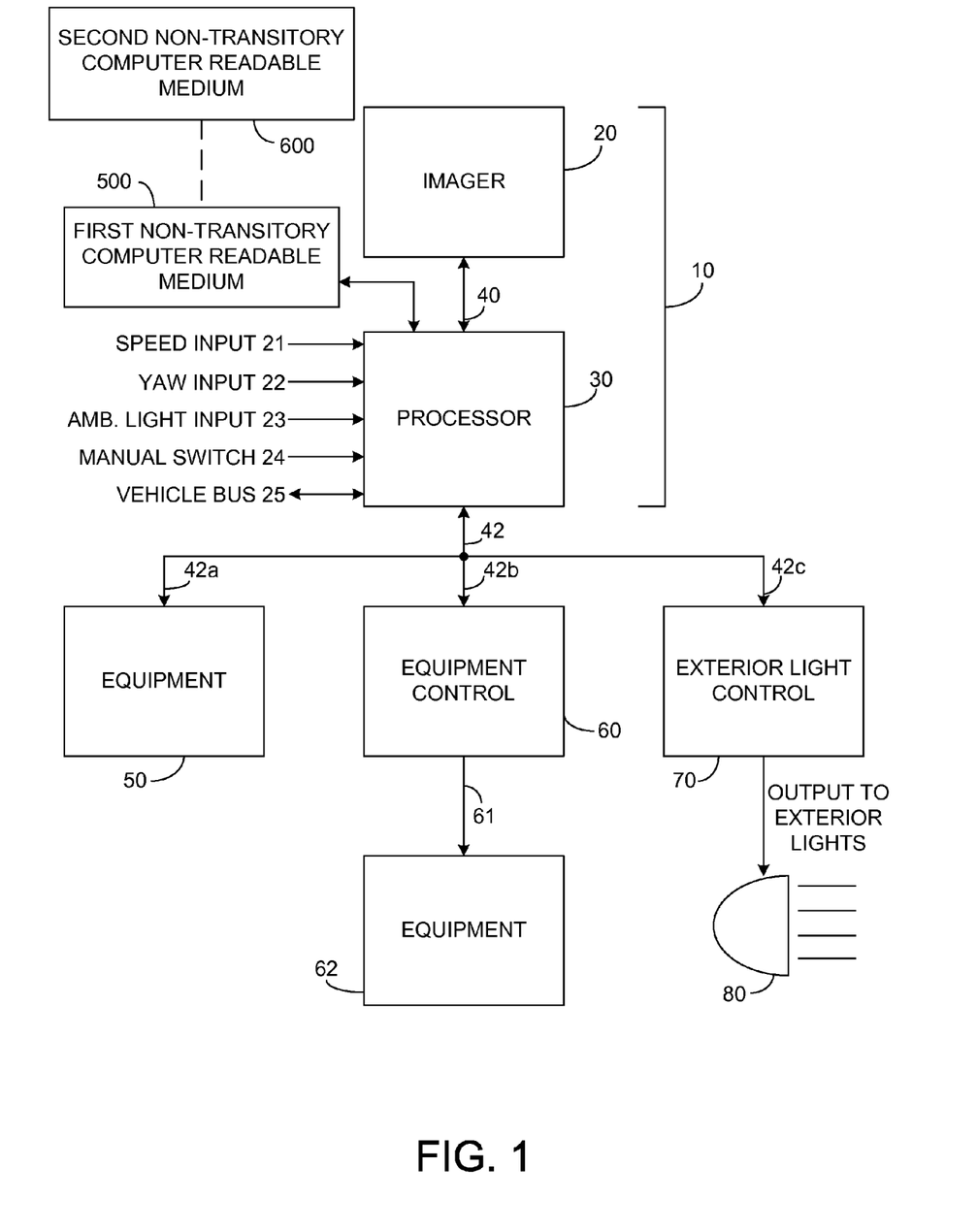
FIG. 1 is a block diagram of a vehicle equipment control system constructed according to one embodiment.

Embodiments of an imaging system and a vehicle equipment control system 10 are shown in FIG. 1. Vehicle equipment control system 10 is provided for controlling vehicle equipment (50, 62, 80) of a controlled vehicle. Imaging/vehicle equipment control system 10 includes an imager 20 and a processor 30. Imager 20 includes an image sensor (201, FIG. 2) that may be configured to image a scene external and forward of the controlled vehicle and to generate image data corresponding to the acquired images. According to the embodiments directed to an imaging system for a vehicle, imager 20 can be considered to include processor 30. For one of those embodiments directed to an imaging system, processor 30 is configured to: (a) detect a predetermined number of vehicle light sources; (b) average color values of each detected vehicle light source; (c) determine differences between the averaged color values and target color values; and (d) store the differences as color compensation values to be used to compensate color values of subsequently detected vehicle light sources. For those embodiments directed to a vehicle control system, processor 30 is additionally configured to compensate color values of subsequently detected vehicle light sources and generate a signal that may be used to control the vehicle equipment (50, 62, 80) in response to the detection of color compensated vehicle light sources in the captured images. In both of these embodiments, processor 30: (e) determines if color compensation values have been previously determined; (f) detects vehicle light sources in a captured image, if color compensation values have been previously determined, processor 30 performs at least steps (g) and (h) below; (g) calculates a weighted average of color values using previously averaged color values and color values of vehicle light sources detected in the captured image; (h) determines if the weighted average has exceeded a predefined difference limit from the target value, if the weighted average has exceeded the predefined difference limit, processor 30 additionally performs steps (i) and (j) below, if the weighted average has not exceeded the predefined difference limit, processor 30 skips steps (i) and (j); (i) determines differences between the weighted averaged color values and target color values; (j) stores the differences as color compensation values to be used to compensate color values of subsequently detected vehicle light sources; and (k) detects vehicle light sources in each subsequently captured image and performs steps (f)-(h) for each captured image.

According to other embodiments where it is desirable to categorize vehicle light sources into different light source bands, processor 30 may be configured to perform the above steps for each of the color bands. The different bands may be provided for different types of vehicle lights such as one band for HID, Xenon, and LED headlamps; another band for halogen headlamps; and an optional third band for vehicle tail lights. More particularly, in these embodiments, processor 30: (a) categorizes the detected vehicle light sources into at least two light source bands; (b) detects a predetermined number of vehicle light sources in each light source band; (c) averages color values of each detected vehicle light source in each light source band; (d) determines differences between the averaged color values and target color values in each light source band; (e) stores the differences as color compensation values in each light source band to be used to compensate color values of subsequently detected vehicle light sources categorized in a corresponding light source band; and (f) generates a signal that may be used to control the vehicle equipment in response to the detection of color compensated vehicle light sources in the captured images. Additionally, processor 30 may (g) determine if color compensation values have been previously determined in each light source band, if color compensation values have been previously determined, processor 30 performs at least steps (h) - (j) below; (h) detect vehicle light sources in a captured image and categorize the detected vehicle light sources into the at least two light source bands; (i) calculate a weighted average of color values for each light source band using previously averaged color values and color values of vehicle light sources detected in the captured image within each respective light source band; (j) determine if the weighted average has exceeded a predefined difference limit from the target value, if the weighted average has exceeded the predefined difference limit, processor 30 additionally performs steps (k) and (l) below, if the weighted average has not exceeded the predefined difference limit, processor 30 skips steps (k) and (l); (k) determine differences between the weighted averaged color values and target color values for each light source band; (l) store the differences as color compensation values for each light source band to be used to compensate color values of subsequently detected vehicle light sources categorized in a corresponding light source band; and (m) detect vehicle light sources in each subsequently captured image and performs steps (i) and (j) for each captured image.

Additional details of the operation of processor 30 are described below with respect to FIGS. 3-7.

As used herein, a processor 30 may be any form of circuit capable of performing the functions described herein, and thus may include one or more microprocessor or microcontroller, and may additionally or alternatively include electronic circuitry, such as logic circuitry and/or a programmable logic gate array. To the extent used herein, "processor means" includes these structures for a processor as well as equivalent structures that are capable of performing substantially similar functions or subsets of functions.

If imaging system 10 is used as a vehicle equipment control system, processor 30 may be configured to directly connect to the equipment (50) being controlled such that the generated signals directly control the equipment. Alternatively, processor 30 may be configured to connect to an equipment control (60 and 70), which, in turn, is connected to the equipment being controlled (62 and 80) such that the signals generated by processor 30 only indirectly control the equipment. For example, in the case of the equipment 80 being exterior lights, processor 30 may analyze the image data from imager 20 so as to generate signals that are more of a recommendation for an exterior light control 70 to use when controlling exterior lights. Thus, it can be said that the generated signals may be used to control the equipment 80. The signals may further include not just a recommendation, but also a code representing a reason for the recommendation so that equipment controls 60 and 70 may determine whether or not to override a recommendation.

As shown in FIG. 1, various inputs (such as inputs 21-24) may be provided to processor 30 that may be taken into account in analyzing the image data or forming a recommendation or direct control signal. In some cases, such inputs may instead be provided to equipment control (60 and 70). For example, input from manual switches may be provided to equipment control (60 and 70), which may allow equipment control (60 and 70) to override a recommendation from processor 30. It will be appreciated that various levels of interaction and cooperation between processor 30 and equipment controls 60 and 70 may exist. One reason for separating control functions is to allow imager 20 to be located in the best location in the vehicle for obtaining images, which may be a distance from the equipment to be controlled and to allow communication over the vehicle bus 25.

According to one embodiment, the equipment 80 that system 10 controls may include one or more exterior lights and the signal generated by processor 30 may be an exterior light control signal. In this embodiment, exterior lights 80 may be controlled directly by processor 30 or by an exterior light control 70, which receives a control signal from processor 30. As used herein, the "exterior lights" broadly includes any exterior lighting on the vehicle. Such exterior lights may include headlamps (both low and high beam if separate from one another), tail lights, foul weather lights (such as fog lights), brake lights, center-mounted stop lights (CHMSLs), turn signals, and back-up lights, etc. The exterior lights may be operated in several different modes including conventional low-beam and high-beam states. They may also be operated as daytime running lights, and additionally as super-bright high beams in those countries where they are permitted.

The brightness of the exterior lights may also be continuously varied between the low, high, and super-high states. Separate lights may be provided for obtaining each of these exterior lighting states or the actual brightness of the exterior lights may be varied to provide these different exterior lighting states. In either case, the "perceived brightness" or illumination pattern of the exterior lights is varied. As used herein, the term "perceived brightness" means the brightness of the exterior lights as perceived by an observer outside the vehicle. Most typically, such observers will be drivers or passengers in a preceding vehicle or in a vehicle traveling along the same street in the opposite direction. Ideally, the exterior lights are controlled such that if an observer is located in a vehicle within a "glare area" relative to the vehicle (i.e., the area in which the observer would perceive the brightness of the exterior lights as causing excessive glare), the beam illumination pattern is varied such that the observer is no longer in the glare area. The perceived brightness and/or glare area of the exterior lights may be varied by changing the illumination output of one or more exterior lights, by steering one or more lights to change the aim of one or more of the exterior lights, selectively blocking or otherwise activating or deactivating some or all of the exterior lights, altering the illumination pattern forward of the vehicle, or a combination of the above.

Imager 20 may be any conventional hardware. Examples of suitable imagers are disclosed in published United States Patent Publication Nos. US 20080192132 A1 and US 20120072080 A1, and in U.S. Provisional Application Nos. 61/500,418 entitled "MEDIAN FILTER" filed on Jun. 23, 2011, by Jon H. Bechtel et al.; 61/544,315 entitled "MEDIAN FILTER" filed on Oct. 7, 2011, by Jon H. Bechtel et al.; and 61/556,864 entitled "HIGH DYNAMIC RANGE CAMERA LOW LIGHT LEVEL FILTERING" filed on Nov. 8, 2011, by Jon H. Bechtel et al., the entire disclosures of which are incorporated herein by reference.

In the example shown in FIG. 1, imager 20 may be controlled by processor 30. Communication of imager parameters as well as image data occurs over communication bus 40, which may be a bi-directional serial bus, parallel bus, a combination of both, or other suitable means. Processor 30 serves to perform equipment control functions by analyzing images from imager 20, determining an equipment (or exterior light) state based upon information detected within those images, and communicating the determined equipment (or exterior light) state to the equipment 50, equipment control 60, or exterior light control 70 through bus 42, which may be the vehicle bus 25, a CAN bus, a LIN bus or any other suitable communication link. Processor 30 may control the imager 20 to be activated in several different modes with different exposure times and different readout windows. Processor 30 may be used to both perform the equipment or exterior light control function and control the parameters of imager 20.

Processor 30 can also take advantage of the availability of signals (such as vehicle speed) communicated via discrete connections 21-24 or over the vehicle bus 25 in making decisions regarding the operation of the exterior lights 80. In particular, speed input 21 provides vehicle speed information to the processor 30 from which speed can be a factor in determining the control state for the exterior lights 80 or other equipment. Manual dimmer switch input 24 is connected to a manually actuated switch (not shown) to provide a manual override signal for an exterior light control state. Yaw (or steering wheel) input 22 may be used to identify if the vehicle is traveling straight or is turning. Ambient light input 23 may be used to determine the ambient brightness of the environment in which the vehicle is traveling. Some or all of the inputs 21, 22, 23, 24 and outputs 42*a*, 42*b*, and 42*c*, as well as any other possible inputs or outputs, can optionally be provided through vehicle bus 25 shown in FIG. 1. Alternatively, these inputs 21-24 may be provided to equipment control 60 or exterior light control 70.

Processor 30 can control, at least in part, other equipment 50 within the vehicle which is connected to processor 30 via vehicle bus 42. Specifically, the following are some examples of one or more equipment 50 that may be controlled by processor 30: exterior lights 80, a rain sensor, a compass, information displays, windshield wipers, a heater, a defroster, a defogger, an air conditioning system, a telephone system, a navigation system, a security system, a tire pressure monitoring system, a garage door opening transmitter, a remote keyless entry system, a telematics system, a voice recognition system such as a digital signal processor-based voice actuation system, a vehicle speed control, interior lights, rearview mirrors, an audio system, an engine control system, and various other switches and other display devices that may be located throughout the vehicle.

In addition, processor 30 may be, at least in part, located within a rearview assembly of a vehicle or located elsewhere within the vehicle. Processor 30 may also use a second processor (or processors) or equipment control 60 that may be located in a rearview assembly or elsewhere in the vehicle in order to control certain kinds of equipment 62. Equipment control 60 can be connected to receive via vehicle bus 42 signals generated by processor 30. Equipment control 60 subsequently communicates and controls equipment 62 via bus 61. For example, equipment control 60 may be a windshield wiper control unit which controls windshield wiper equipment, turning this equipment ON or OFF. Equipment control 60 may also be an electrochromic mirror control unit where processor 30 is programmed to communicate with the electrochromic control unit in order for the electrochromic control unit to change the reflectivity of the electrochromic mirror(s) in response to information obtained from an ambient light sensor, a glare sensor, as well as any other components coupled to the processor 30. Specifically, equipment control unit 60 in communication with processor 30 may control the following equipment: exterior lights, a rain sensor, a compass, information displays, windshield wipers, a heater, a defroster, a defogger, air conditioning, a telephone system, a navigation system, a security system, a tire pressure monitoring system, a garage door opening transmitter, a remote keyless entry, a telemetry system, a voice recognition system such as a digital signal processor-based voice actuation system, a vehicle speed warning, interior lights, rearview mirrors, an audio system, a climate control, an engine control, and various other switches and other display devices that may be located throughout the vehicle.

Figure 2:
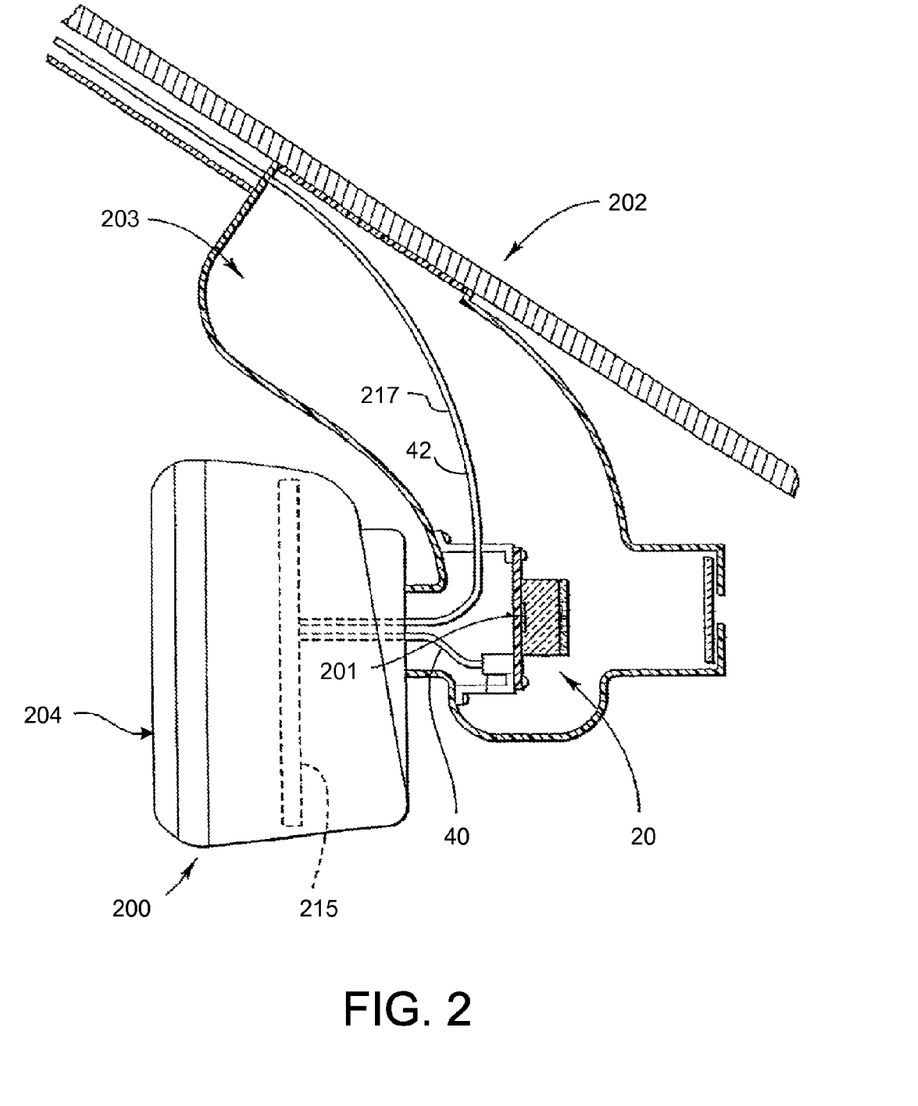
FIG. 2 is a partial cross section of a rearview assembly incorporating a vehicle equipment control system in accordance with another embodiment.

Portions of system 10 can be advantageously integrated into a rearview assembly 200 as illustrated in FIG. 2, wherein imager 20 is integrated into a mount 203 of rearview assembly 200. This location provides an unobstructed forward view through a region of the windshield 202 of the vehicle that is typically cleaned by the vehicle's windshield wipers (not shown). Additionally, mounting the image sensor 201 of imager 20 in the rearview assembly permits sharing of circuitry such as the power supply, microprocessor and light sensors.

Referring to FIG. 2, image sensor 201 is mounted within rearview mount 203, which is mounted to vehicle windshield 202. The rearview mount 203 provides an opaque enclosure for the image sensor 201 with the exception of an aperture through which light is received from a forward external scene.

Processor 30 of FIG. 1 may be provided on a main circuit board 215 and mounted in rearview housing 204 as shown in FIG. 2. As discussed above, processor 30 may be connected to imager 20 by a bus 40 or other means. The main circuit board 215 may be mounted within rearview housing 204 by conventional means. Power and a communication link 42 with the vehicle electrical system, including the exterior lights 80 (FIG. 1), are provided via a vehicle wiring harness 217 (FIG. 2).

Rearview assembly 200 may include a mirror element or a display that displays a rearward view. The mirror element may be a prismatic element or an electro-optic element, such as an electrochromic element.

Additional details of the manner by which system 10 may be integrated into a rearview mirror assembly 200 are described in U.S. Pat. No. 6,611,610, the entire disclosure of which is incorporated herein by reference. Alternative rearview mirror assembly constructions used to implement exterior light control systems are disclosed in U.S. Pat. No. 6,587,573, the entire disclosure of which is incorporated herein by reference.

The method for controlling vehicle equipment of a controlled vehicle is described herein as being implemented by processor 30 using image data received from imager 20. This method may be a subroutine executed by any processor, and thus this method may be embodied in a non-transitory computer readable medium encoded with or otherwise having stored thereon software instructions that, when executed by a processor, cause the processor to control the equipment of the controlled vehicle, by executing the steps of the method described below. In other words, aspects of the inventive method may be achieved by software stored on a non-transitory computer readable medium or software modifications or updates to existing software residing in a non-transitory computer readable medium. Such software or software updates may be downloaded into a first non-transitory computer readable media 500 of processor 30 (or locally associated with processor 30 or some other processor) typically prior to being installed in a vehicle, from a second non-transitory computer readable media 600 located remote from first non-transitory computer readable media 500. Second non-transitory computer readable media 600 may be in communication with first non-transitory computer readable media 500 by any suitable means, which may at least partially include the Internet or a local or wide area wired or wireless network.

Figure 3:
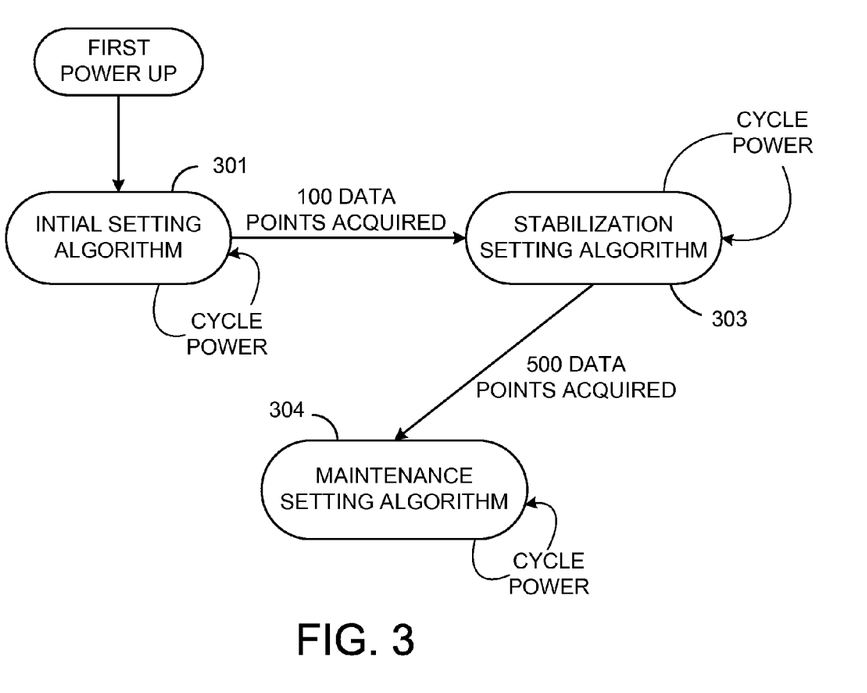
FIG. 3 is a state diagram of a color compensation routine executed by a processor in the system shown in FIG. 1.

The method for controlling vehicle equipment of a controlled vehicle is described below with respect to FIGS. 1 and 3-7. FIG. 3 is a state diagram and FIGS. 4-7 show a flow chart illustrating one example of the method as executed by processor 30. The method is performed in each cycle (SB cycle or power up) for which control is to take place. In the context of a headlamp control system, this would occur when it is dark enough outside to warrant headlamp control and possibly when the vehicle is traveling above a prescribed speed and possibly when the vehicle is traveling a straight path as determined by a compass or yaw sensor.

In the state diagram shown in FIG. 3, upon start up, processor 30 executes an initial setting algorithm 301 to set initial color compensation values and remains in this state until a first predetermined number of data points (e.g., 100 data points) are acquired. Once the first predetermined number of data points are acquired, processor 30 executes a stabilization setting algorithm 303 in order to stabilize the color compensation values using more data points and remains in this state until a second predetermined number of data points (e.g., 500 data points) are acquired. Once the second predetermined number of data points are acquired, processor 30 executes a maintenance setting algorithm 304 in order to ensure that there are no significant changes needed to any color compensation values. The details of how processor 30 may execute this state diagram are discussed below in connection with the flow chart shown in FIGS. 4-7.

Figure 4:
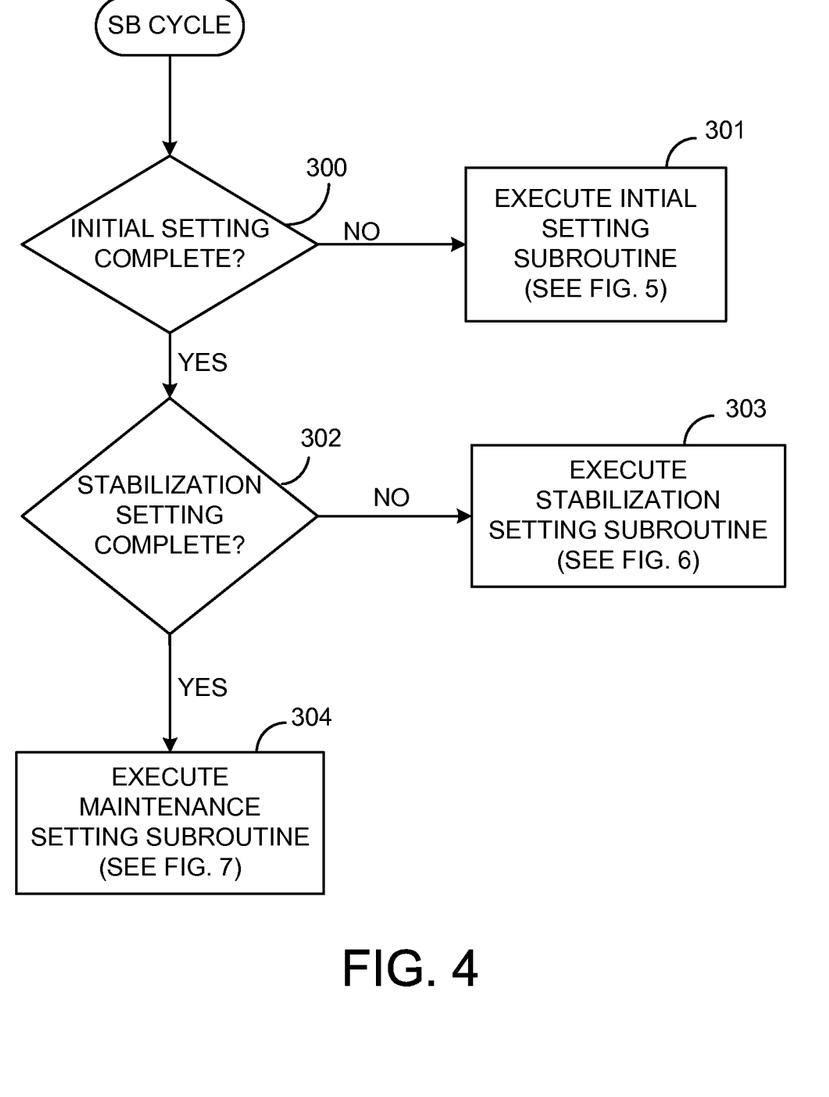
FIG. 4 is a flow chart of a color compensation routine executed by a processor in the system shown in FIG. 1.

Referring to FIG. 4, the method begins at step 300, when processor 30 determines if the initial setting is complete. The initial setting is complete if color compensation values have been previously determined for at least some of the light source color bands. If the initial setting is not complete for a color band, processor 30 proceeds to the initial setting subroutine in step 301, which is illustrated in the flow chart of FIG. 5. If the initial setting is complete, processor 30 proceeds to the maintenance setting subroutine in step 304, which is illustrated in the flow chart of FIG. 7.

Figure 5:
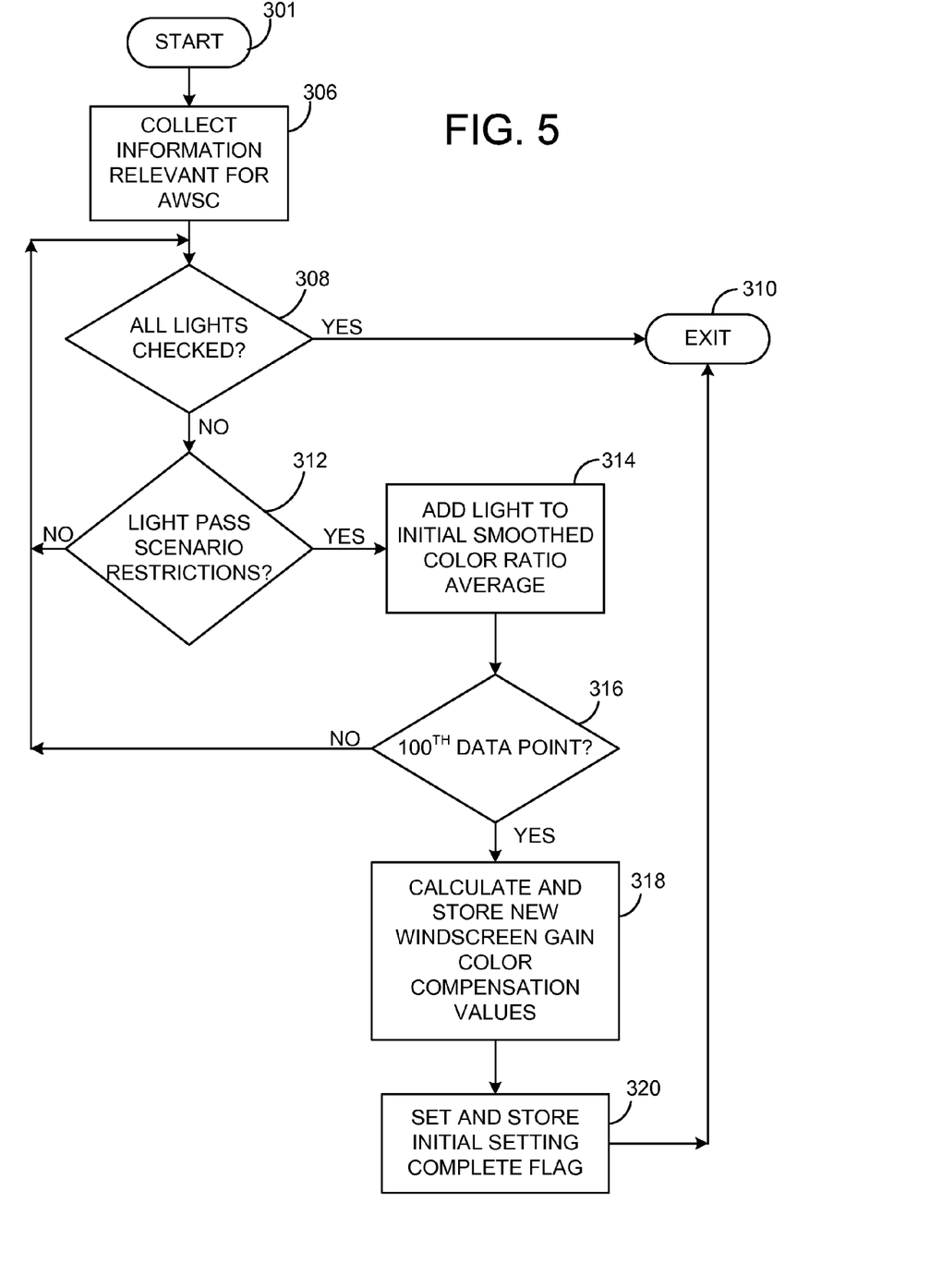
FIG. 5 is a flow chart of an initial setting subroutine called in the routine illustrated in FIG. 4.

Referring to FIG. 5, the initial setting routine 301 begins with step 306 in which processor 30 collects information relevant for auto windscreen compensation (AWSC). This may include checking whether it is dark enough outside (using input 23), whether the vehicle is traveling in a city environment, and whether the vehicle is traveling at a sufficient speed (using input 21) and in a straight enough path (using input 22). Then processor 30 determines if all the light sources detected within a captured image have been checked in step 308. If they have, processor 30 exits the subroutine in step 310. Otherwise, processor 30 advances to step 312 where it determines if a particular one of the light sources within the captured image passes certain scenario restrictions so as to be considered highly likely to be a light source of a vehicle. If not, processor 30 returns to step 308 to select the next light source in the captured image. If the light source meets the criteria, processor 30 goes to step 314. Criteria for determining the likelihood that a light source is a vehicle light source is known from the above-identified patents and applications pertaining to vehicle exterior light control systems. In addition, in step 312, for some embodiments, processor 30 may categorize the detected vehicle light sources into at least two light source bands. As mentioned above, these bands may include a first band for HID, Xenon and LED headlamps; a second band for halogen headlamps; and an optional third band for tail lights.

Next, in step 314, processor 30 averages the color values (or a ratio thereof) for the detected vehicle light source with a running average of the color values (or a ratio thereof) for all other vehicle light sources in the same color band. Each vehicle light source will have at least two color values. These color values may be for red and non-red pixels on which the vehicle light source is imaged or may include, for example, red, green, and blue color values depending upon the imaging system that is used. Further, the color compensation values may be stored in the form of a ratio of the color values (i.e., the ratio of red to non-red).

In step 316, processor 30 then determines if a first predetermined number of vehicle light sources was detected in a particular light source band. An example of such a first predetermined number may be 100 detected vehicle light sources. If a first predetermined number of vehicle light sources was detected in a light source band, processor 30 advances to step 318 to calculate and store new windscreen color gain compensation values. Processor 30 calculates the compensation values by determining differences between the averaged color values and target color values for that particular light source band and then storing the differences as the color compensation values for that light source band to be used to compensate color values of subsequently detected vehicle light sources categorized in that light source band. Following step 318, processor 30 executes step 320 whereby an initial setting complete flag is set and stored for reference in step 300.

If, in step 316, processor 30 determines that a first predetermined number of vehicle light sources has not been used to compute the averages in step 314 for a particular light source band, processor 30 returns to step 308 to process the next light source in the captured image or to otherwise exit the subroutine in step 310 if there are no more light sources in the captured image. It should be noted that if the subroutine is exited, it may be re-entered upon capture of the next image until such time that compensation values are initially calculated for each color band.

Once compensation values have been computed for a particular color band, processor 30 may then compensate color values of subsequently detected vehicle light sources categorized in a corresponding light source band and then generate a control signal that is used to control the vehicle equipment in response to the detection of color compensated vehicle light sources in the captured images. In the context of a headlamp control system, by color compensating the detected vehicle light sources for coloration of the windscreen, processor 30 may more accurately determine whether light sources detected in a captured image are light sources of vehicles to which the processor 30 should respond by generating a control signal.

Figure 6:
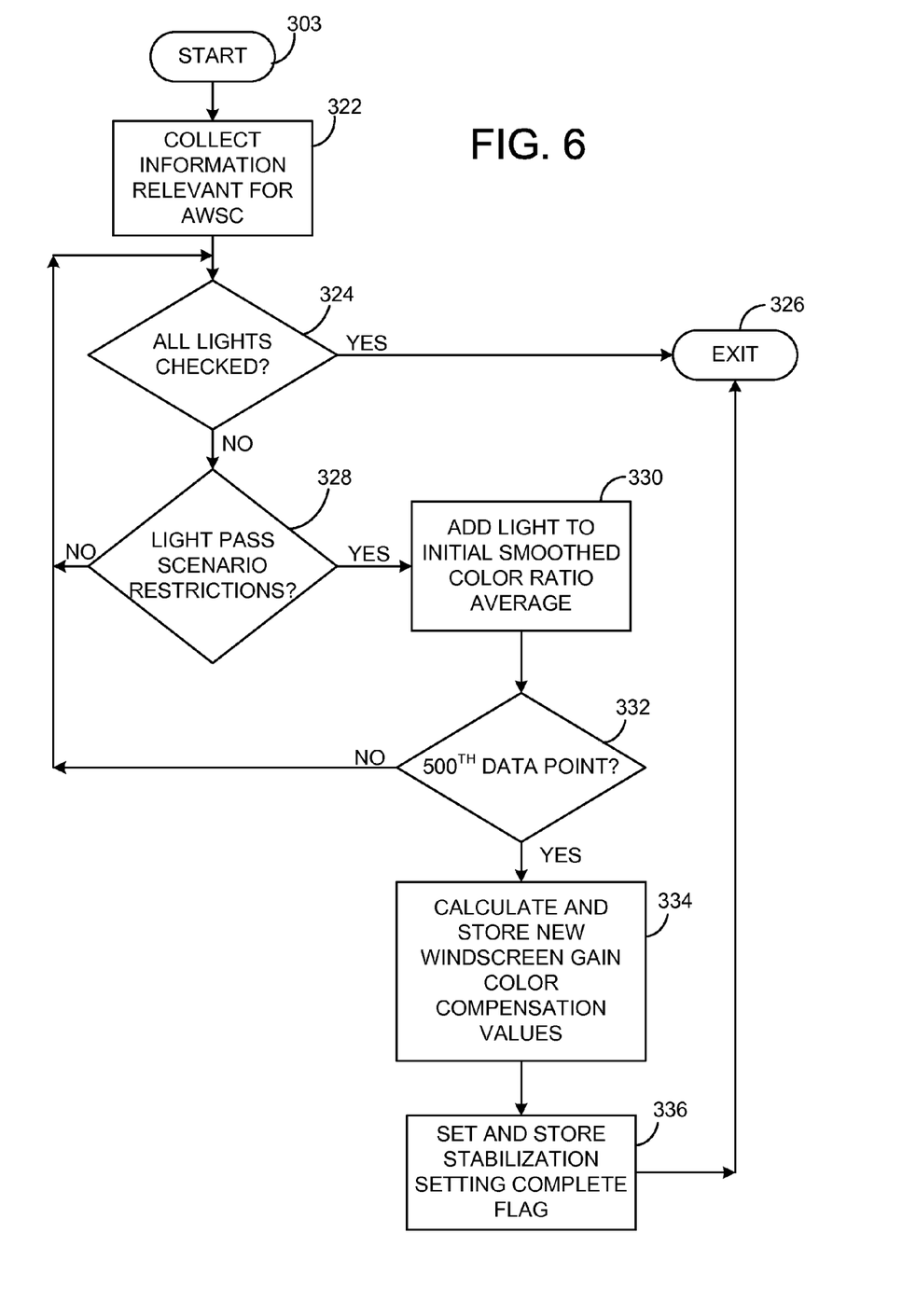
FIG. 6 is a flow chart of a stabilization setting subroutine called in the routine illustrated in FIG. 4.

Once the initial setting subroutine 301 has been executed for a color band so that color compensation values have been computed for that color band, processor 30 never again computes color compensation values for that color band using the initial subroutine. Instead, processor 30 uses the stabilization subroutine 303, which is shown in FIG. 6. The stabilization subroutine 303 begins with step 322 in which processor 30 collects information relevant for AWSC. This step may be identical to step 306 described above.

Then processor 30 determines if all the light sources detected within a captured image have been checked in step 324. If they have, processor 30 exits the subroutine in step 326. Otherwise, processor 30 advances to step 328 where it determines if a particular one of the light sources within the captured image passes certain scenario restrictions so as to be considered highly likely to be a light source of a vehicle. If not, processor 30 returns to step 324 to select the next light source in the captured image. If the light source meets the criteria in step 328, processor 30 goes to step 330. Criteria for determining the likelihood that a light source is a vehicle light source is known from the above-identified patents and applications pertaining to vehicle exterior light control systems. In addition, in step 330, for some embodiments, processor 30 may categorize the detected vehicle light sources into at least two light source bands. As mentioned above, these bands may include a first band for HID, Xenon and LED headlamps; a second band for halogen headlamps; and an optional third band for tail lights.

Next, in step 330, processor 30 averages the color values (or a ratio thereof) for the detected vehicle light source with a running average of the color values (or a ratio thereof) for all other vehicle light sources in the same color band. Each vehicle light source will have at least two color values. These color values may be for red and non-red pixels on which the vehicle light source is imaged or may include, for example, red, green, and blue color values depending upon the imaging system that is used. Further, the color compensation values may be stored in the form of a ratio of the color values (i.e., the ratio of red to non-red).

In step 332, processor 30 then determines if a second predetermined number of vehicle light sources was detected in a particular light source band. An example of such a second predetermined number may be 500 detected vehicle light sources. If a second predetermined number of vehicle light sources was detected in a light source band, processor 30 advances to step 334 to calculate and store new windscreen color gain compensation values. Processor 30 calculates the compensation values by determining differences between the averaged color values and target color values for that particular light source band and then storing the differences as the color compensation values for that light source band to be used to compensate color values of subsequently detected vehicle light sources categorized in that light source band. Following step 334, processor 30 executes step 336 whereby a stabilization setting complete flag is set and stored for reference in step 302.

If, in step 332, processor 30 determines that a second predetermined number of vehicle light sources has not been used to compute the averages in step 334 for a particular light source band, processor 30 returns to step 324 to process the next light source in the captured image or to otherwise exit the subroutine in step 326 if there are no more light sources in the captured image. It should be noted that if the subroutine is exited, it may be re-entered upon capture of the next image until such time that compensation values are stabilized for each color band.

Once compensation values have been computed for a particular color band, processor 30 may then compensate color values of subsequently detected vehicle light sources categorized in a corresponding light source band and then generate a control signal that is used to control the vehicle equipment in response to the detection of color compensated vehicle light sources in the captured images. In the context of a headlamp control system, by color compensating the detected vehicle light sources for coloration of the windscreen, processor 30 may more accurately determine whether light sources detected in a captured image are light sources of vehicles to which the processor should respond by generating a control signal.

Figure 7:
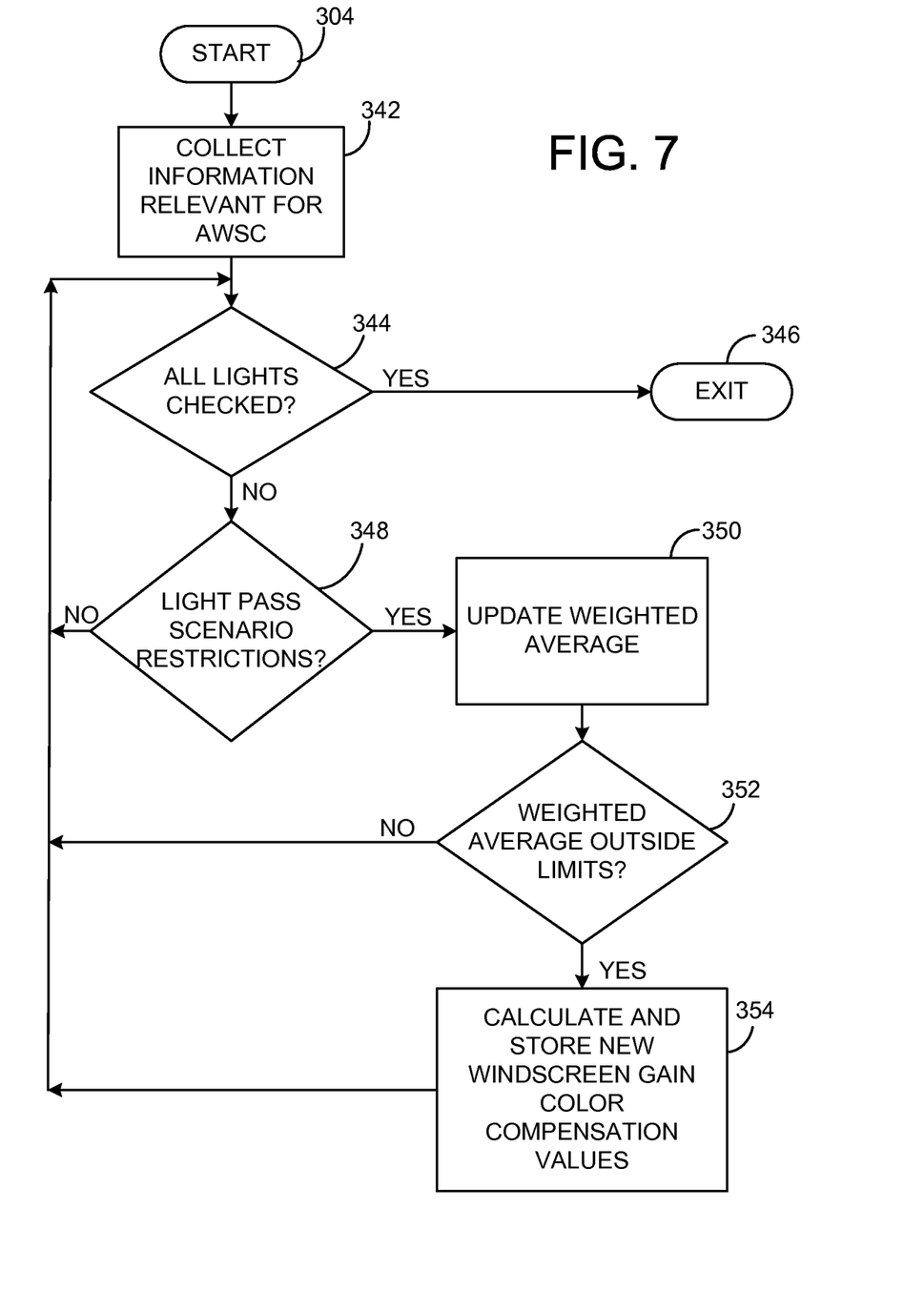
FIG. 7 is a flow chart of a maintenance subroutine called in the routine illustrated in FIG. 4.

Once the stabilization setting subroutine 303 has been executed for a color band so that color compensation values have been computed for that color band, processor 30 never again computes color compensation values for that color band using the stabilization subroutine. Instead, processor 30 uses the maintenance subroutine 304, which is shown in FIG. 7. The maintenance subroutine 304 begins with step 342 in which processor 30 collects information relevant for AWSC. This step may be identical to step 306 described above.

Next, processor 30 determines if all the light sources detected within a captured image have been checked in step 342. If they have, processor 30 exits the subroutine in step 346. Otherwise, processor 30 advances to step 348 where it determines if a particular one of the light sources within the captured image passes certain scenario restrictions so as to be considered highly likely to be a light source of a vehicle. Step 348 may be identical to step 312 described above. If not, processor 30 returns to step 344 to select the next light source in the captured image. If the light source meets the criteria, processor 30 goes to step 350. In addition, in step 348, for some embodiments, processor 30 may categorize the detected vehicle light sources into at least two light source bands.

Next, in step 350, processor 30 updates the previously computed running average of the color values for the detected vehicle light source for the particular color band. Unlike the corresponding step 314 in the initial setting subroutine, step 350 computes a weighted average that more heavily weighs the prior average than the color values of the newly detected vehicle lights. Then, in step 352, processor 30 determines if the newly computed weighted average has exceeded a predefined difference limit from the target value. If it has exceeded the predefined difference limit, processor 30 advances to step 354, where it calculates and stores new windscreen color compensation values before returning to step 344. If the weighted average has not exceeded the predefined difference limit, processor 30 returns to step 344 without calculating new color compensation values.

The maintenance subroutine 304 may be executed for each captured image frame or periodically as may be desired. By executing the initial and stabilization setting routines, the color compensation values for the windscreen originally installed on the vehicle may be quickly, accurately, and automatically computed without manual intervention. The speed at which the initial and stabilization color compensation values are computed may be affected by selecting the predetermined number of vehicle light sources that are to be included in the initial and stabilization calculations. By continuously or periodically executing the maintenance subroutine, color compensation values may be automatically and dynamically changed to account for replacements of the windscreen throughout the life of the vehicle.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. An imaging system for a vehicle comprising:
   an image sensor positioned in the vehicle for capturing images through a windscreen of the vehicle and for generating image data corresponding to the captured images; and
   a processor coupled to the image sensor configured for receiving and analyzing the image data and detecting vehicle light sources in the captured images, wherein the processor is further configured to:
   (a) detect a predetermined number of vehicle light sources;
   (b) average color values of each detected vehicle light source;
   (c) determine differences between the averaged color values and target color values; and
   (d) store the differences as color compensation values to compensate color values of subsequently detected vehicle light sources.

2. The imaging system of claim 1, wherein the processor is further configured to:
   (e) determine if color compensation values have been previously determined;
   (f) detect vehicle light sources in a captured image, if color compensation values have been previously determined, the processor performs at least steps (g) and (h) below;
   (g) calculate a weighted average of color values using previously averaged color values and color values of vehicle light sources detected in the captured image;
   (h) determine if the weighted average has exceeded a predefined difference limit from the target value, and based on determining that the weighted average has exceeded the predefined difference limit, the processor is further configured to:
     (i) determine differences between the weighted averaged color values and target color values; and
     (j) store the differences as color compensation values to be used to compensate color values of subsequently detected vehicle light sources; and
   (k) detect vehicle light sources in each subsequently captured image and performs steps (f)-(h) for each captured image.

3. The imaging system of claim 1, wherein the predetermined number is 100.

4. The imaging system of claim 1, wherein the processor further categorizes the detected vehicle light sources into at least two light source bands and performs each of at least steps (a)-(d) for each of the at least two light source bands.

5. The imaging system of claim 1, wherein the processor is further configured to repeat steps (a)-(d) using a second predetermined number of light sources.

6. The imaging system of claim 5, wherein the second predetermined number is 500.

7. A vehicle equipment control system comprising:
   an image sensor positioned in the vehicle, the image sensor operable to capture images through a windscreen of the vehicle and generate image data corresponding to the captured images; and
   a processor coupled to the image sensor, the processor configured to receive and analyze the image data and detect vehicle light sources in the captured images, wherein the processor is further configured to:
   (a) detect a predetermined number of vehicle light sources;
   (b) average color values of each detected vehicle light source;
   (c) determined differences between the averaged color values and target color values; and
   (d) store the differences as color compensation values to compensate color values of subsequently detected vehicle light source,
   wherein the processor is further configured to compensate color values of subsequently detected vehicle light sources and generate a signal used to control a vehicle equipment in response to the detection of color compensated vehicle light sources in the captured images.

8. The vehicle equipment control system of claim 7, wherein the vehicle equipment comprises exterior lights of the controlled vehicle.

9. A vehicle equipment control system for a controlled vehicle comprising:
   an image sensor positioned in the vehicle for capturing images through a windscreen of the controlled vehicle and for generating image data corresponding to the captured images; and
   a processor coupled to the image sensor configured for receiving and analyzing the image data and detecting vehicle light sources in the captured images, wherein the processor is configured to:
   (a) categorize the detected vehicle light sources into at least two light source bands;
   (b) detect vehicle light sources in each light source band;
   (c) average color values of each detected vehicle light source in each light source band;
   (d) determine differences between the averaged color values and target color values in each light source band;
   (e) store the differences as color compensation values in each light source band to compensate color values of subsequently detected vehicle light sources categorized in a corresponding light source band; and
   (f) generate a signal used to control a vehicle equipment in response to the detection of color compensated vehicle light sources in the captured images.

10. The vehicle equipment control system of claim 9, wherein the processor is further configured to:
    (g) determine if color compensation values have been previously determined in each light source band, and based on a determination that color compensation values have been previously determined, the processor is further configured to:
    (h) detect vehicle light sources in a captured image and categorizes the detected vehicle light sources into the at least two light source bands;
    (i) calculate a weighted average of color values for each light source band using previously averaged color values and color values of vehicle light sources detected in the captured image within each respective light source band; and
    (j) determine if the weighted average has exceeded a predefined difference limit from the target value, and based on a determination that the weighted average has exceeded the predefined difference limit, the processor is further configured to:
- (k) determine differences between the weighted averaged color values and target color values for each light source band; and
- (l) store the differences as color compensation values for each light source band to compensate color values of subsequently detected vehicle light sources categorized in a corresponding light source band; and
- (m) detect vehicle light sources in each subsequently captured image and performs steps (i) and (j) for each captured image.

11. The vehicle equipment control system of claim 9, wherein the vehicle equipment includes exterior lights of the controlled vehicle.

12. The vehicle equipment control system of claim 9, wherein the processor is further configured to repeat steps (a)-(e) using a second predetermined number of light sources.

13. A method for controlling equipment of a controlled vehicle, comprising:
- (a) acquiring images of a scene external and forward of the controlled vehicle and generating image data corresponding to the acquired images;
- (b) detecting a predetermined number of vehicle light sources;
- (c) averaging color values of each detected vehicle light source;
- (d) determining differences between the averaged color values and target color values;
- (e) storing the differences as color compensation values to compensate color values of subsequently detected vehicle light sources; and
- (f) generating a signal used to control a vehicle equipment in response to the detection of color compensated vehicle light sources in the captured images.

14. The method of claim 13 further comprising:
- (g) determining if color compensation values have been previously determined;
- (h) detecting vehicle light sources in a captured image, and based on a determination that color compensation values have been previously determined:
  - (i) calculating a weighted average of color values using previously averaged color values and color values of vehicle light sources detected in the captured image; and
  - (j) determining if the weighted average has exceeded a predefined difference limit from the target value, if the weighted average has exceeded the predefined difference limit:
    - (k) determining differences between the weighted averaged color values and target color values; and
    - (l) storing the differences as color compensation values to compensate color values of subsequently detected vehicle light sources; and
- (m) detecting vehicle light sources in each subsequently captured image and performing steps (h)-(j) for each captured image.

15. The method of claim 13 and further comprising categorizing the detected vehicle light sources into at least two light source bands and performing each of at least steps (a)-(f) for each of the at least two light source bands.

16. The method of claim 13, wherein the vehicle equipment includes exterior lights of the controlled vehicle.

17. A non-transitory computer readable medium having stored thereon software instructions that, when executed by a processor, cause the processor to:
- (a) acquire images of a scene external and forward of the controlled vehicle and generating image data corresponding to the acquired images;
- (b) detect vehicle light sources;
- (c) average color values of each detected vehicle light source;
- (d) determine differences between the averaged color values and target color values;
- (e) store the differences as color compensation values to compensate color values of subsequently detected vehicle light sources; and
- (f) generate a signal to control a vehicle equipment in response to the detection of color compensated vehicle light sources in the captured images.

18. The non-transitory computer readable medium of claim 17, wherein the software instructions further cause the processor to:
- (g) determine if color compensation values have been previously determined;
- (h) detect vehicle light sources in a captured image, and based on a determination that color compensation values have been previously determined, the software instructions further cause the processor to:
  - (i) calculate a weighted average of color values using previously averaged color values and color values of vehicle light sources detected in the captured image; and
  - (j) determine if the weighted average has exceeded a predefined difference limit from the target value, and based on a determination that the weighted average has exceeded the predefined difference limit, the software instructions further cause the processor to
    - (k) determine differences between the weighted averaged color values and target color values; and
    - (l) store the differences as color compensation values to be used to compensate color values of subsequently detected vehicle light sources; and
- (m) detect vehicle light sources in each subsequently captured image and performing steps (h)-(j) for each captured image.

19. The non-transitory computer readable medium of claim 17, wherein the software instructions further cause the processor to categorize the detected vehicle light sources into at least two light source bands and wherein each of at least steps (a)-(e) are executed for each of the at least two light source bands.

20. The non-transitory computer readable medium of claim 17, wherein the vehicle equipment includes exterior lights of the controlled vehicle.

* * * * *

UNITED STATES PATENT AND TRADEMARK OFFICE
CERTIFICATE OF CORRECTION

| | | |
|---|---|---|
| PATENT NO. | : 9,434,327 B2 | Page 1 of 1 |
| APPLICATION NO. | : 14/541385 | |
| DATED | : September 6, 2016 | |
| INVENTOR(S) | : Phillip R. Pierce | |

It is certified that error appears in the above-identified patent and that said Letters Patent is hereby corrected as shown below:

In the Claims

Column 14, Line 18, Claim 1, "source," should be --sources,--.

Column 16, Line 42, Claim 18, "to" should be --to:--.

Signed and Sealed this
Third Day of January, 2017

Michelle K. Lee
*Director of the United States Patent and Trademark Office*